United States Patent [19]
Waidhofer

[11] Patent Number: 5,017,144
[45] Date of Patent: May 21, 1991

[54] RADAR DETECTOR ADAPTOR

[76] Inventor: Michael Waidhofer, 12003 Cedar Pass, Houston, Tex. 77077

[21] Appl. No.: 529,539

[22] Filed: May 29, 1990

[51] Int. Cl.⁵ .......................................... H01R 13/73
[52] U.S. Cl. ...................................... 439/34; 439/447; 439/502; 224/312; 248/74.1; 248/231.8
[58] Field of Search ............... 439/502, 503, 669, 640, 439/675, 699, 700, 504, 34, 668, 447, 445, 448, 501; 248/231.8, 74.1; 224/312

[56] References Cited

U.S. PATENT DOCUMENTS

| | | | |
|---|---|---|---|
| 2,822,541 | 2/1958 | Sichak et al. | 343/783 |
| 3,094,663 | 6/1963 | Siegel | 455/324 |
| 3,520,988 | 7/1970 | Ballock, Sr. | 439/502 |
| 3,833,906 | 9/1974 | Augustine | 342/174 |
| 4,318,103 | 3/1982 | Roettele et al. | 342/20 |
| 4,326,653 | 4/1982 | Stone | 224/312 |
| 4,647,139 | 3/1987 | Yang | 439/503 |
| 4,760,497 | 7/1988 | Roston | 439/534 |
| 4,783,619 | 11/1988 | Herman | 439/504 |

Primary Examiner—Gary F. Paumen
Attorney, Agent, or Firm—Leon Gilden

[57] ABSTRACT

Apparatus wherein a kit includes a plurality of adaptor plugs securable within one of a plurality of available receptacles within an automotive environment to conveniently adapt a radar detector to available circuitry within an automotive environment. The kit includes a J-shaped mount and a first, second, third, and fourth adaptor plug assembly each individually electrically associated with a dipole plug for electrical association with the radar detector. Further, a wiring support is provided for convenient positioning of accessory wires utilized with the kit.

2 Claims, 4 Drawing Sheets

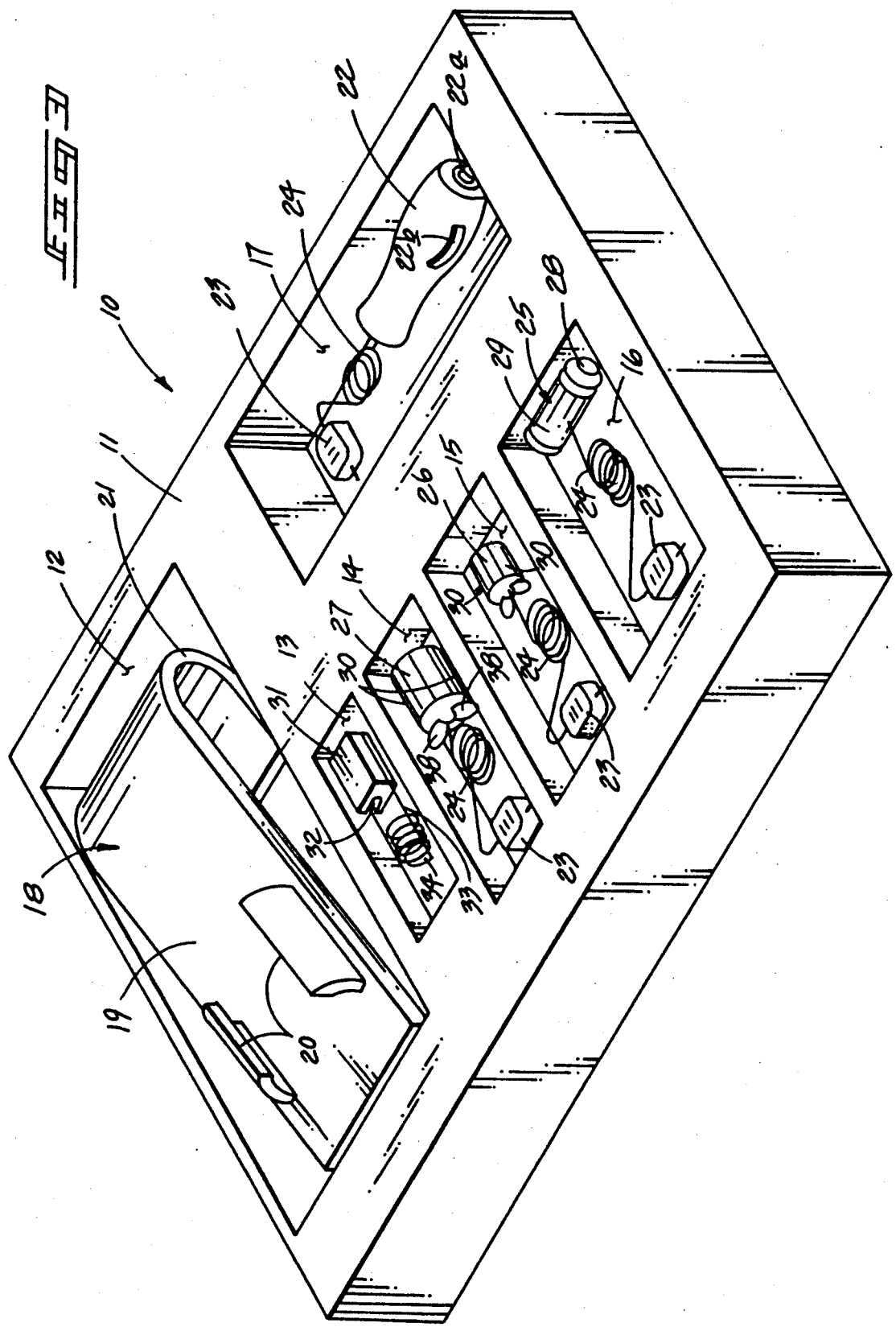

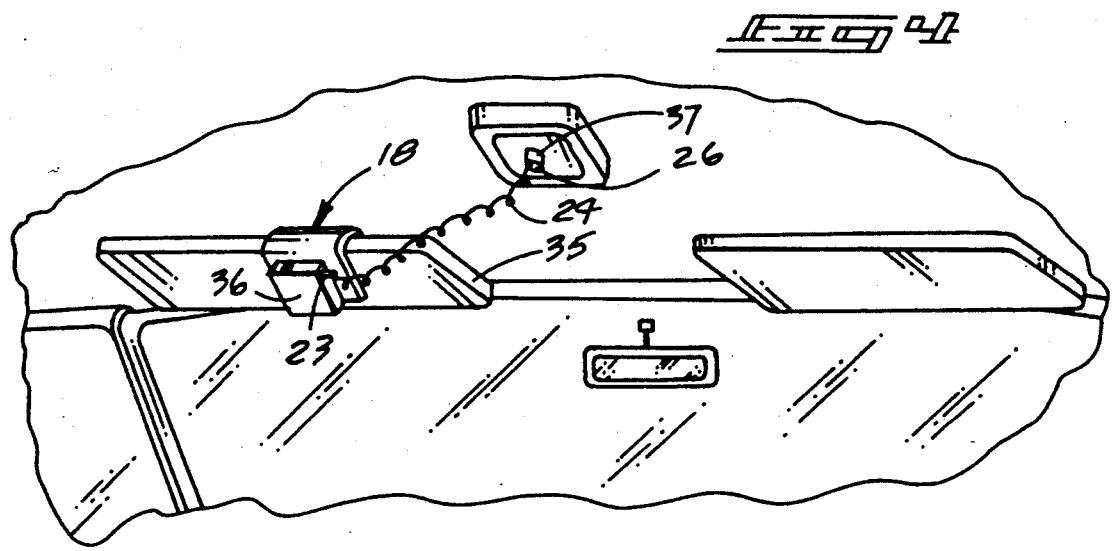
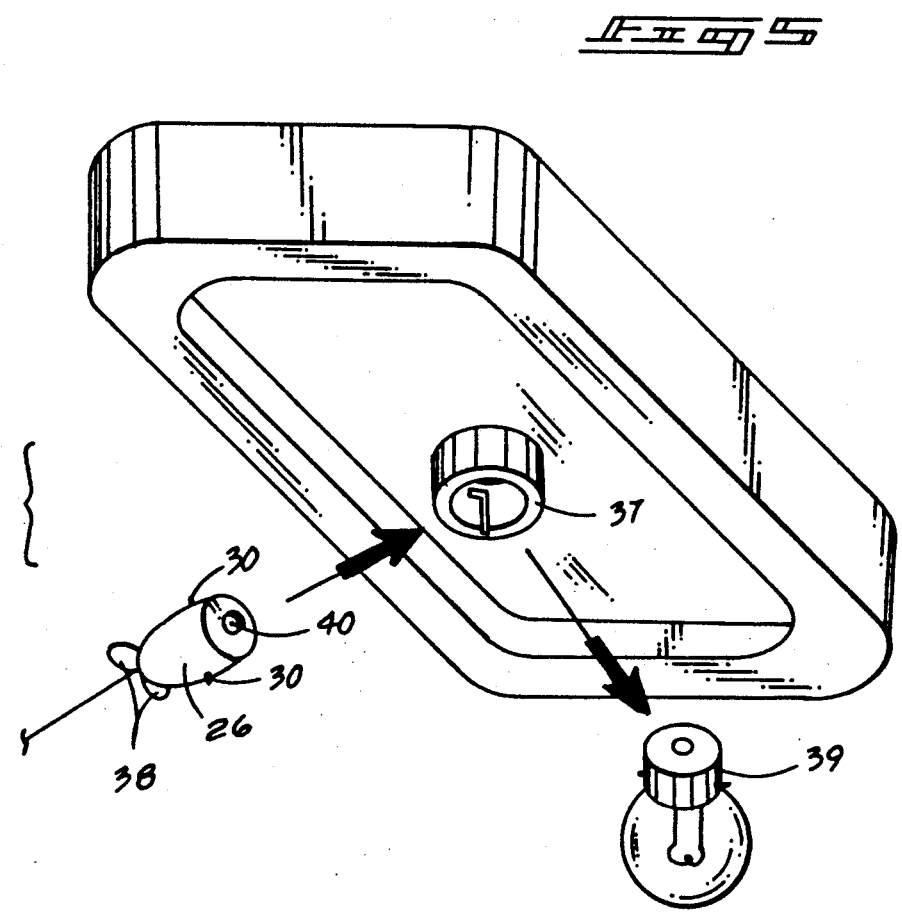

RADAR DETECTOR ADAPTOR

BACKGROUND OF THE INVENTION

1. Field of the Invention

The field of the invention relates to radar detectors, and more particularly pertains to a new and improved radar detector adaptor kit utilizing a plurality of selectively utilized adapters for mounting of the radar detector to one of a plurality of electrical sources to minimize visual obstruction by adaptor plug wires within the automotive environment.

2. Description of the Prior Art

In the positioning and mounting of a radar detector within a conventional automotive environment, an associated connector wire is frequently positioned to obstruct vision to an operator and passenger within the automotive interior compartment.

In addition to providing a physical nuisance, the obstructing wire can effect a safety hazard by obstructing obscuring vision or distracting a driver in the operation of an associated vehicle. Prior art structure in the mounting of radar detectors and the like may be found in U.S. Pat. No. 4,760,497 to ROSTON utilizing a mounting bracket to mount a radar detector with a mounting bracket utilizing a separate plug to receive electrical transmission line from the radar detector for communication with an associated adaptor and in turn is wired to an interior circuitry of an automobile.

U.S. Pat. No. 3,094,663 to SIEGEL illustrates the use of a conventional radar detector circuitry and its conventional electric transmission line for association with an electrical energy source.

U.S. Pat. No. 2,822,541 to SICHAK sets forth a lens antenna system for use in transmission and reception of radio frequency energy in mirowave form.

U.S. Pat. No. 3,833,906 to AUGUSTINE sets forth a radar system for use in automobiles for measuring speed of the associated automobile.

U.S. Pat. No. 4,318,103 to ROETTELE et al provides a further example of a radar detector system and associated circuitry therefor.

As such, it may be appreciated that there continues to be a need for a new and improved radar detector adaptor kit to permit convenience of adaption of an associated radar to any of a plurality of electrical sources including various illumination sockets positioned proximate a visor assembly of an associated automobile and in this respect, the present invention substantially fulfills this need.

SUMMARY OF THE INVENTION

In view of the foregoing disadvantages inherent in the known types of radar detector organizations present in the prior art, the present invention provides a new and improved radar detector adaptor kit wherein the same provides for immediate electrical association of the radar detector with any convenient electrical source such as illumination members and the like. As such, the general purpose of the present invention, which will be described subsequently in greater detail, is to provide a new and improved radar detector adaptor kit which has all the advantages of the prior art radar detector assemblies and none of the disadvantages.

To attain this, the radar detector adaptor kit of the instant invention includes apparatus wherein a kit includes a plurality of adaptor plugs securable within one of a plurality of available receptacles within an automotive environment to conveniently adapt a radar detector to available circuitry within an automotive environment. The kit includes a J-shaped mount and a first, second, third, and fourth adaptor plug assembly each individually electrically associated with a dipole plug for electrical association with the radar detector. Further, a wiring support lume is provided for convenient positioning of accessory wires utilized with the organization.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved radar detector adaptor kit which has all the advantages of the prior art radar detector organizations and none of the disadvantages.

It is another object of the present invention to provide a new and improved radar detector adaptor kit which may be easily and efficiently manufactured and marketed.

It is a further object of the present invention to provide a new and improved radar detector adaptor kit which is of a durable and reliable construction.

An even further object of the present invention is to provide a new and improved radar detector adaptor kit which is susceptible of a low cost of manufacture with ragard to both materials and labor, and which accordingly is then susceptible of low prices of sale to the consuming public, thereby making such radar detector adaptor kits economically available to the buying public.

Still yet another object of the present invention is to provide a new and improved radar detector adaptor kit which provides in the apparatuses and methods of the prior art some of the advantages thereof, while simultaneously overcoming some of the disadvantages normally associated therewith.

Still another object of the present invention is to provide a new and improved radar detector adaptor kit which may be compactly stored when out being utilized.

Yet another object of the present invention is to provide a new and improve radar detector adaptor kit wherein the same sets forth convenient and operative association of a radar detector with a conventional light socket mounted within an automotive environment.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DECRIPTION OF THE DRAWINGS

The invention will be better understood and objects other than those set forth above will become apparent when consideration is given to the following detailed description thereof. Such description makes reference to the annexed drawings wherein;

FIG. 3 is an isometric illustration of the instant invention.

FIG. 4 is an isometric illustration of the instant invention utilized to associate a radar detector within an automotive environment.

FIG. 5 is an isometric illustration somewhat enlarged of the illumination socket and its association with an adaptor of the instant invention.

DESCRIPTION OF THE PREFERRED EMBODIMENT

Figure 1:
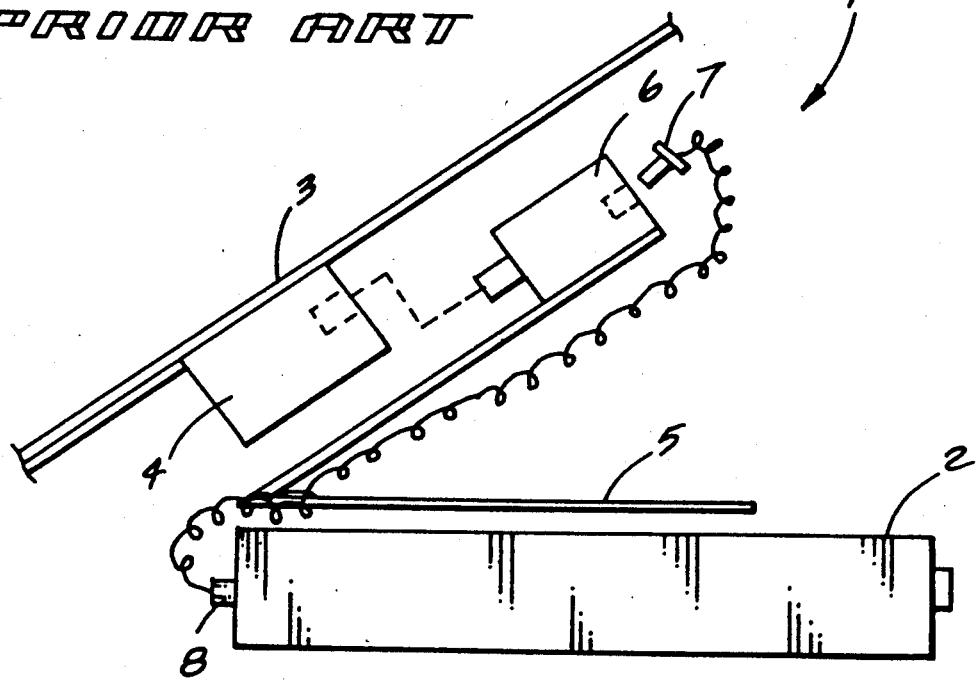
FIG. 1 is an orthographic side view taken in elevation of a prior art radar detector securement apparatus.
Figure 2:
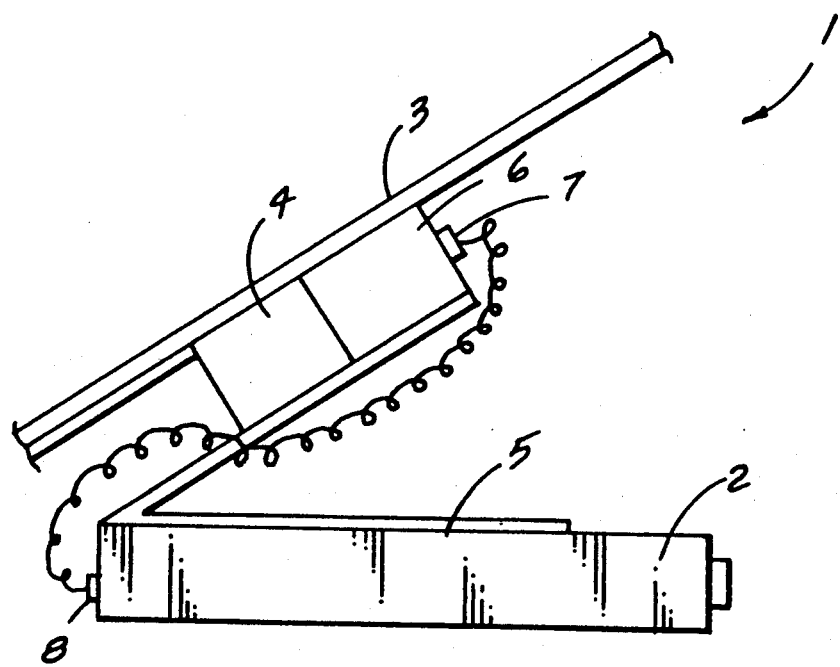
FIG. 2 is an orthographic side view taken in elevation of the organization of FIG. 1 in an assembled configuration.

With reference now to the drawings, and in particular to FIGS. 1 to 7 thereof, a new and improved radar detector adaptor kit embodying the principles and concepts of the present invention and generally designated by the reference numeral 10 will be described.

FIG. 1 illustrates a prior art adaptor assembly 1 wherein a radar detector 2 is positioned to a support 3 that utilizes electrical plug member 4 in electrical communication with circuitry of an associated automobile that accommodates a further plug member 6 that in turn is in electrical communication with the radar detector 2 by a first radar detector plug member 7 that is in electrical communication with a dipole plug 8 with a V-shaped plate 5 providing requisite separation and orientation between the components.

Figure 6:
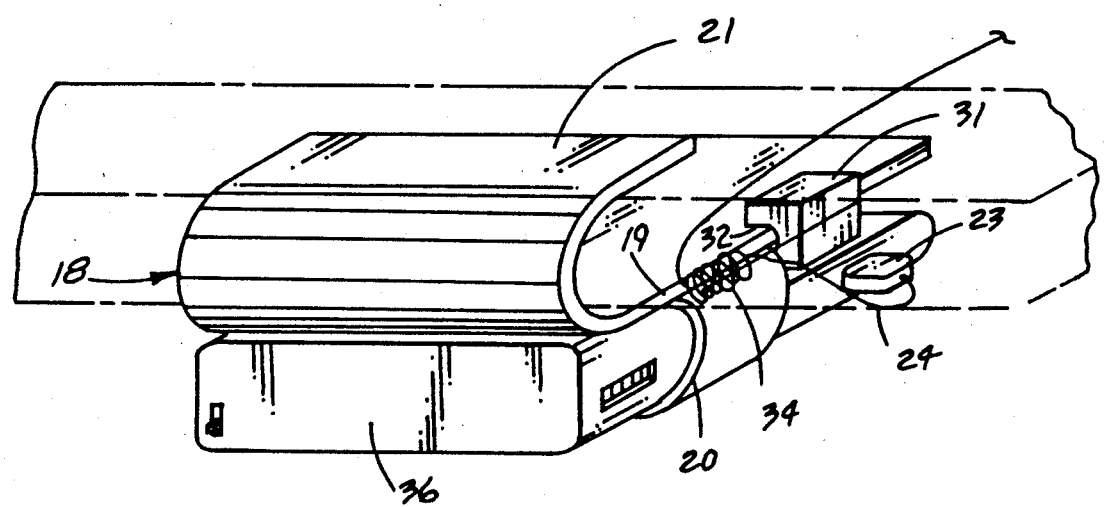
FIG. 6 is an isometric illustration of the radar detector utilized in association with components of the instant invention.
Figure 7:
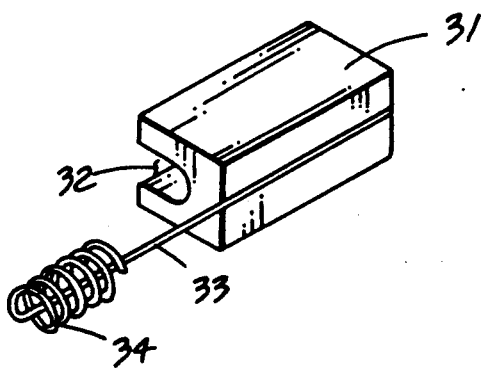
FIG. 7 is an isometric illustration of the U-shaped clip utilized by the instant invention.

More specifically, the radar detector adaptor kit 10 of the instant invention essentially comprises, a container 11 including a series of elongate longitudinally aligned cavities including a first cavity 12, a second cavity 13, a third cavity 14, a fourth cavity 15, a fifth cavity 16, and a sixth cavity 17. A J-shaped visor mount 18 is positioned within the first cavity and includes a planar member 19 and an underlying arcuate leg 21 defining the J-shaped configuration with a pair of confronting arcuate legs 20 mounted integrally to a top surface of a planar member 19 to secure a radar detector 36 (see FIG. 6 for example). The second cavity 13 includes a resilient U-shaped clip 31 arranged for mounting to an edge portion of the planar member 19 in a manner as illustrated in FIG. 6. The resilient U-shaped clip 31 is defined by a longitudinally aligned body including a U-shaped channel 32 directed longitudinally to define base legs for resiliently engaging opposed sides of the planar member 19. A rigid spine 33 is longitudinally aligned with the U-shaped channel 32 and extends parallel to and beyond the U-shaped channel and the body the terminate in a helical wire support 34.

The helical wire support 34 is configured to mount and receive elongate lengths of electrical conductor wire utilized by the components of the instant invention to minimize obstruction of such wire and keep such wire in a convenient and orderly orientation relative to the apparatus.

The third cavity 14, the fourth cavity 15, and the fifth cavity 16 each include a respective third, second, and first light bulb adaptor plug 27, 26, and 25 respectively therewithin. Each respective adaptor plug defined by the first, second, and third adaptor plugs is defined by a respective first, second, and third cylindrical body defined by a respective first, second, and third diameter wherein the second diameter is greater than the first diameter and the third diameter is greater than the second diameter to accommodate various diameters of light bulb sockets to be found within an automotive environment and thereby accommodate electrical association of an associated radar detector with a convenient light bulb plug in a manner to be described.

Each of the adaptor plugs includes longitudinally spaced projections 30 to be received within the plug slots of a conventional light receptacle socket 37 of a type as illustrated in FIG. 5 that utilizes a light bulb 39 that is removed for insertion of an associated adaptor plug therewithin. The first adaptor plug 25 is defined by an end nose contact connector and a body ring contact connector 28 and 29 respectively to accommodate a further plug socket found in conventional automobile environments. The sixth cavity 17 includes a cigarette lighter plug adaptor 22 for use in electrical association of a radar detector with a cigarette ligher socket found in automobiles utilizing a forward contact 22a and side spring contacts 22b. Each of the adaptor plugs includes a radar detector dipole plug 23 for reception and electrical communication with an associated radar detector and an elongate flexible electrical conductor 24 electrically associating each dipole plug 23 and an associated adaptor plug. Further, the second and third adaptor plugs 26 and 27 each include wing legs 38 fixedly mounted to an end of each cylindrical body and wherein the legs are diametrically aligned relative to one another to permit manual engagement of the legs to ease their insertion within an associated receptacle socket 37. It should be noted that the second and third adaptor plugs 26 and 27 each include a forward contact 40 coaxially mounted to a forward end of each cylindrical body that cooperate with the spaced projections 30 to effect electrical communication with each light bulb socket 37.

In this manner, it may be appreciated that excessive wiring and its obstruction relative to a passenger and a driver of an associated automobile is maintained in an orderly and secured manner relative to the visor mount 18 and permits mounting to a convenient electrical source such as a dome light as illustrated in FIG. 4 or may be mounted to various accessory lights such as a visor light, a rear view mirror light, and the like conventionally utilized in contemporary automobile construction.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A radar detector adaptor kit for mounting a radar detector in electrical communication with electrical circuitry within an automotive interior, the adaptor kit comprising, a visor mount for securement to an automotive visor, the visor mount defined by a "J" shaped configuration including a planar member and an arcuate leg overlying the planar member wherein the planar member includes a plurality of arcuate legs parallel to each other and in confronting relationship to receive the radar detector therebetween, and at least one adaptor plug, the adaptor plug including a cylindrical body, the cylindrical body including a flexible electrical conductor, and the flexible electrical conductor connected to the adaptor plug at one end and to a dipole electrical plug at its other end for electrical communication with the radar detector, and wherein the adaptor plug includes a cylindrical body defined by a first diameter, and an electrical nose contact and spaced ring contacts mounted on the cylindrical body for electrical communication with an electrical socket within the automobile, and including a second adaptor plug, the second adaptor plug defined by a cylindrical body defined by a second diameter wherein the second diameter is greater than the first diameter, and a third adaptor plug wherein the third adaptor plug is defined by a cylindrical body defined by a third diameter wherein the third diameter is greater than the first diameter, and the second adaptor plug and the third adaptor plug each include a plurality of offset projections integrally mounted and diametrically opposed to one another on each cylindrical body for reception within a light receptacle socket wherein the light receptacle socket includes slots to receive the projections, and the second and third adaptor plug each include an elongate flexible electrical conductor in electrical association with a dipole plug for electrical communication with the radar detector, and further including a "U" shaped clip, the "U" shaped clip defined by an elongate body, the elongate body including a "U" shaped channel formed therewithin wherein the "U" shaped channel defines spaced leg resiliently biased towards one another to permit securement to the "J" shaped visor mount, and the "U" shaped clip further including an elongate rigid spine longitudinally aligned with the body and spaced parallel to the "U" shaped channel and including a helical wound wire support mounted at a remote terminal end of the spine and spaced from the body for reception and winding of an electrical conductor thereabout.

2. An adaptor kit as set forth in claim 1, including a container, the container including a first elongate cavity to receive the J-shaped visor mount, a second elongate cavity to receive the U-shaped clip, a third elongate cavity to receive the third adaptor plug, a fourth elongate cavity to receive a second adaptor plug, and a fifth elongate cavity to receive the adaptor plug, and a sixth cavity, the sixth cavity receiving a cigarette lighter plug therewithin, the cigarette lighter adaptor plug including an elongate arcuate body including a forward contact and spaced body contacts for reception within a cigarette lighter socket of the automobile, and the cigarette lighter plug including an elongate flexible electrical conductor and a dipole electrical plug mounted to the conductor and spaced from the cigarette lighter plug.

* * * * *